US012521863B2

(12) United States Patent
Kreischer

(10) Patent No.: US 12,521,863 B2
(45) Date of Patent: Jan. 13, 2026

(54) HAND-HELD PULLING AND COMPRESSION DEVICE AND HYDRAULIC ACTUATOR

(71) Applicant: TKR Spezialwerkzeuge GmbH, Gevelsberg (DE)

(72) Inventor: Torsten Kreischer, Wetter (DE)

(73) Assignee: TKR Spezialwerkzeuge GmbH, Gevelsberg (DE)

(*) Notice: Subject to any disclaimer, the term of this patent is extended or adjusted under 35 U.S.C. 154(b) by 45 days.

(21) Appl. No.: 18/752,512

(22) Filed: Jun. 24, 2024

(65) Prior Publication Data

US 2024/0424657 A1 Dec. 26, 2024

(51) Int. Cl.
*B25F 5/00* (2006.01)

(52) U.S. Cl.
CPC .................................... *B25F 5/005* (2013.01)

(58) Field of Classification Search
CPC ... B31B 50/006; B31B 50/005; B31B 50/044; B31B 50/042; B31B 2105/00; B65H 9/10
USPC ............................................................ 493/52
See application file for complete search history.

(56) References Cited

FOREIGN PATENT DOCUMENTS

| | | | | |
|---|---|---|---|---|
| DE | 102009040126 | | 3/2011 | |
| DE | 102009040126 | A1 * | 3/2011 | B21J 15/06 |
| DE | 102021107120 | | 6/2022 | |
| DE | 102021107120 | A1 * | 6/2022 | B25F 5/00 |
| EP | 2551529 | A2 * | 1/2013 | B25F 5/00 |
| WO | 2023094695 | A1 | 6/2023 | |

* cited by examiner

*Primary Examiner* — Jacob A Smith
(74) *Attorney, Agent, or Firm* — ICE MILLER LLP; Justin D. Swindells

(57) ABSTRACT

The invention relates to a hand-held pulling and compression device and a hydraulic actuator for a hand-held pulling and compression device for driving hydraulic tools, with a housing body having a working chamber filled with hydraulic fluid, a hydraulic piston arranged in the working chamber to be displaceable between a starting position and an end position and a hydraulic tool connection with a hydraulic channel connected to the working chamber and having a self-closing valve. In order to provide a hydraulic actuator for an electro-mechanically driven hand-held pulling and compression device and a hand-held pulling and compression device which enables hydraulic tools to be driven in addition to electro-mechanically driven pulling and pressing tools, it is provided that on the hydraulic actuator the housing body has a connecting section for detachably fixing the hydraulic actuator to a connection section of the pulling and compression device and the hydraulic piston has a coupling section for connection to a drive element of the pulling and compression device which is adjustable relative to the connection section.

8 Claims, 3 Drawing Sheets

HAND-HELD PULLING AND COMPRESSION DEVICE AND HYDRAULIC ACTUATOR

CROSS-REFERENCE TO RELATED APPLICATION

Figure 1:
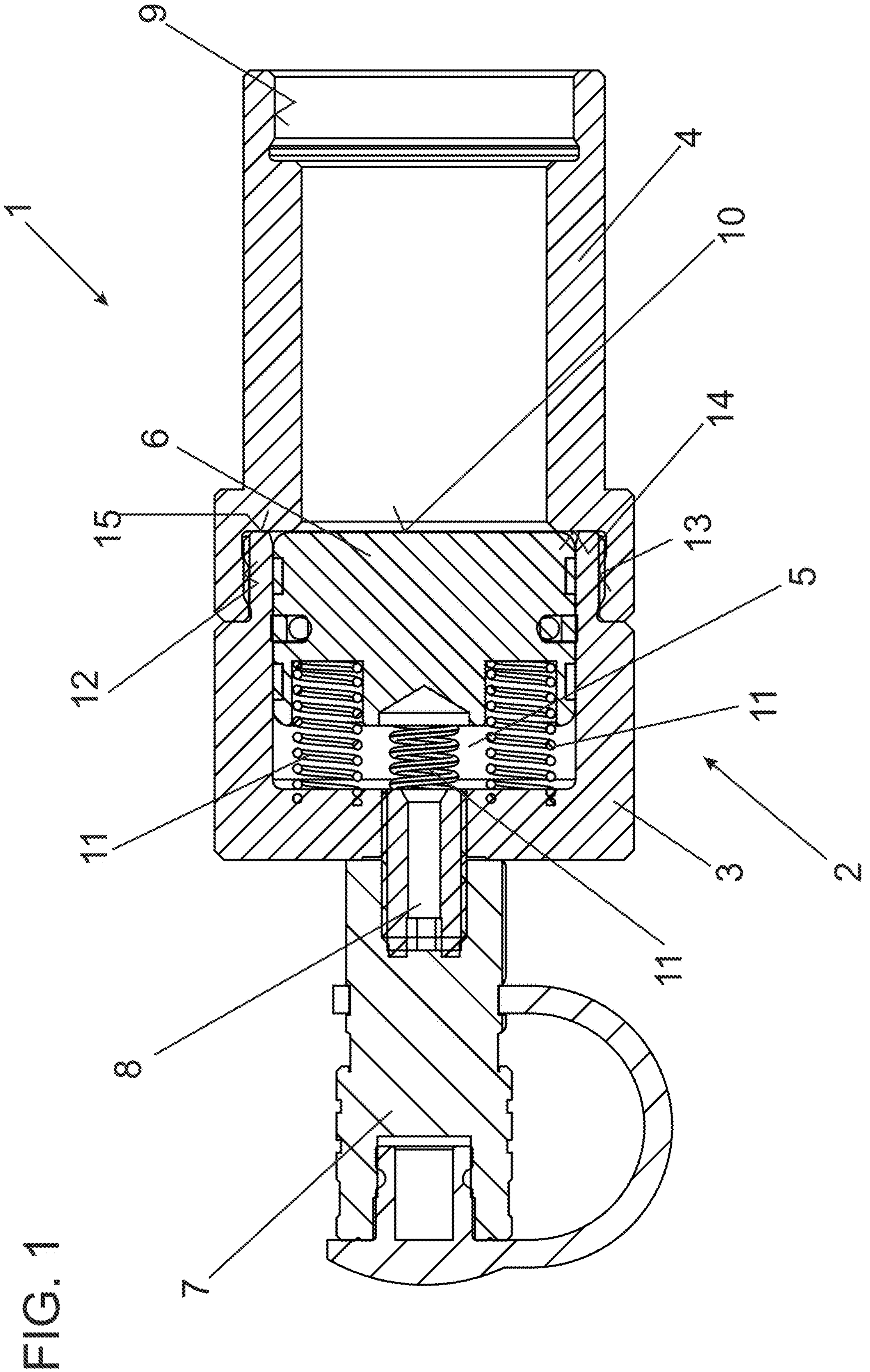

This application is a convention priority application which claims priority to Germany patent application number 10 2023 116 740.5, entitled "Hand-Held Pulling and Compression Device and Hydraulic Actuator," filed Jun. 26, 2023, the disclosure of which is incorporated herein by reference in its entirety.

The invention relates to a hand-held pulling and compression device and a hydraulic actuator for a hand-held pulling and compression device for driving hydraulic tools, with

- a housing body with a working chamber filled with hydraulic fluid,
- a hydraulic piston arranged in the working chamber to be displaceable between a starting position and an end position and
- a hydraulic tool connection with a hydraulic channel connected to the working chamber and having a self-closing valve.

Hand-held pulling and compression devices are known from the state of the art in a variety of configurations. In some of the known pulling and compression devices, the pulling and pressing tools that can be connected to the devices are adjusted by means of an electro-mechanical drive unit. Another group of pulling and compression devices provide hydraulic pressure to drive pulling and pressing tools designed as hydraulic tools. The hydraulic pressure can be generated, for example, by a compressed air drive, whereby a hydraulic pressure required for operating the hydraulic tools is generated by pneumatic adjustment of a pneumatic piston and a suitable transmission.

Due to the hydraulic pressure required for the use of hydraulic tools, it is not possible to connect them to purely electro-mechanical pulling and pressing devices. This incompatibility makes it necessary to have at least two adapted drive devices available if both electro-mechanically driven and hydraulically driven tools are required.

Based on this, the invention is based on the object of providing a hydraulic actuator for an electro-mechanically driven hand-held pulling and compression device and a hand-held pulling and compression device which makes it possible to drive hydraulic tools in addition to electro-mechanically driven pulling and pressing tools.

The invention solves the by a hydraulic actuator with the features of claim 1 and by a hand-held pulling and compression device with the features of claim 8. Advantageous further embodiments of the hydraulic actuator are given in claim 2 to 7.

For driving hydraulic tools, i.e. tools for the adjustment of which hydraulic pressure is required, the hydraulic actuator according to the invention has a working chamber filled with hydraulic fluid, which is delimited by an inner wall of a housing body and by an end surface, facing the working chamber, of a hydraulic piston arranged in the working chamber to be displaced between a starting position and an end position. To drive a hydraulic tool, the hydraulic actuator also has a hydraulic tool connection, which is connected to the working chamber via a hydraulic channel and is closed by a self-closing valve. An adjustment movement of the hydraulic piston from its starting position towards its end position thus generates hydraulic pressure, by means of which hydraulic tools connected to the hydraulic tool connection can be supplied.

A characteristic feature of the hydraulic actuator according to the invention is that

- the housing body has a connecting section for detachably fixing the hydraulic actuator to a connection section of the pulling and compression device, and
- the hydraulic piston has a coupling section for connection to a drive element of the pulling and compression device which is adjustable relative to the connection section.

The design of the housing body with a connecting section allows the hydraulic actuator to be fixed in place on an electro-mechanically driven pulling and compression device so that it can be used to drive hydraulic tools. The hydraulic piston is reliably connected via its coupling section to a drive element that can be adjusted via the electro-mechanical drive, e.g. a tool holder of the pulling and compression device.

The fixed arrangement of the hydraulic actuator on the pulling and compression device and the connection of the drive element of the pulling and compression device to the hydraulic piston make it possible to reliably adjust the hydraulic piston between its starting position and its end position, so that the hydraulic actuator can be used to operate hydraulic tools connected to the hydraulic actuator by means of the electro-mechanical pulling and compression device. It is easy to switch between the connection option for hydraulic tools and electro-mechanically driven pulling and pressing tools by disassembling and assembling the hydraulic actuator.

In principle, the coupling section of the hydraulic piston can be connected to the drive element of the pulling and compression device in any desired manner, whereby in a simplest embodiment the drive element rests against the end surface of the hydraulic piston facing away from the working chamber. According to an advantageous embodiment of the invention, however, it is provided that the coupling section of the hydraulic piston is designed for positive connection with the drive element in the adjustment direction of the hydraulic piston. Such a positive connection ensures adjustment of the hydraulic piston by the drive element both in the direction of the end position and in the direction of the starting position. The positive connection can be designed, for example, in the form of a thread or bayonet lock, so that both tensile and compressive forces of the drive element can be transmitted to the hydraulic piston.

A connection between the hydraulic piston and the drive element of the pulling and compression device is essential for the function of the hydraulic actuator. For the connection, a connecting element can be provided on the hydraulic piston, for example, which can be connected to a drive element within the pulling or device. According to a particularly advantageous embodiment of the invention, however, it is provided that the coupling section of the hydraulic piston is designed for connection to a drive element of the pulling and compression device designed as a tool holder. The tool holder is usually a component arranged in sections on the end face of the pulling and compression device and connected to the electro-mechanical drive, which enables the pulling and pressing tools to be changed easily. The good accessibility required for this makes it particularly easy to connect the hydraulic piston of the hydraulic actuator to the tool holder, e.g. to bring it into contact. It is also possible to connect them in a form-fit manner so that the hydraulic piston is positively connected to the tool holder in both adjustment directions of the hydraulic piston.

The connection of the hydraulic actuator to the pulling and pressing device can in principle be designed in any way. According to a particularly advantageous embodiment of the invention, however, it is provided that the connecting section of the hydraulic actuator has a thread or latching bodies for detachable fixing to the connection section of the pulling and compression device having a thread or latching body receptacles. A corresponding embodiment of the invention enables a secure and easily detachable connection of the hydraulic actuator to the pulling and compression device without the need for further components and/or securing elements. To release the connection between the hydraulic actuator and the pulling and compression device, it is only necessary to unscrew it from the thread or to release the latching connection.

The design of the housing body is basically freely selectable. According to a particularly advantageous embodiment of the invention, however, it is provided that the housing body is multi-part, in particular two-part. In particular, a two-part design of the housing body allows the hydraulic actuator to be designed in such a way that it comprises a piston housing and a base body, whereby in this design the base body can be designed and connected to the piston housing in such a way that the base body rests against the hydraulic piston in sections in the starting position of the hydraulic piston and thus determines the starting position of the hydraulic piston in the housing body. The base body also serves to connect the hydraulic actuator to the pulling and compression device. A corresponding two-part design of the housing body thus allows not only simple assembly and disassembly on the pulling and compression device, but also simple assembly of the hydraulic actuator and, if necessary, simple maintenance.

In the simplest embodiment, a displacement of the hydraulic piston from the starting position to the end position can be ensured by a simple contact of the drive element on the end face of the hydraulic piston facing away from the working chamber. In order to ensure a return of the hydraulic piston for this case, according to a particularly advantageous further development of the invention, it is provided that the hydraulic piston is preloaded, in particular spring preloaded, in the direction of the starting position. This embodiment of the invention ensures that the hydraulic piston is reliably returned to its starting position without the need for further configurations of the hydraulic actuator.

According to a further embodiment of the invention, it is further provided that the hydraulic tool connection has a quick coupling. This enables the hydraulic tools that can be connected to the hydraulic actuator to be changed easily and conveniently. The self-closing valve reliably ensures that no hydraulic fluid escapes from the hydraulic actuator during a tool change. In addition, the hydraulic tool connection, in particular in conjunction with an advantageously provided design as a quick coupling, enables the connection to be used for refilling or filling the working chamber with hydraulic fluid.

The invention further solves the object by a hand-held pulling and compression device for driving interchangeable pulling and pressing tools with

- a drive unit with an electric motor,
- a screw drive with a threaded spindle connected to the drive unit and mounted rotatably on a housing body and a threaded nut mounted rotatably on the threaded spindle and non-rotatably on the housing body via a bearing unit, and
- a coupling unit connected to a tool holder, which is connected to the threaded nut in such a way that tensile and compressive forces resulting from the direction of rotation of the threaded spindle are transmitted to the coupling unit, and wherein the pulling and compression device is detachably connected to a prescribed hydraulic actuator, according to the invention or further developed.

In addition to the drive of mechanically driven pulling and pressing tools via the hydraulic actuator, the hand-held pulling and compression device according to the invention also enables the drive of hydraulic tools, whereby, if necessary, it is possible to switch between a drive of mechanically driven pulling and pressing tools and hydraulic tools in a simple manner by connecting or disconnecting the hydraulic actuator with the pulling and compression device.

Figure 2:
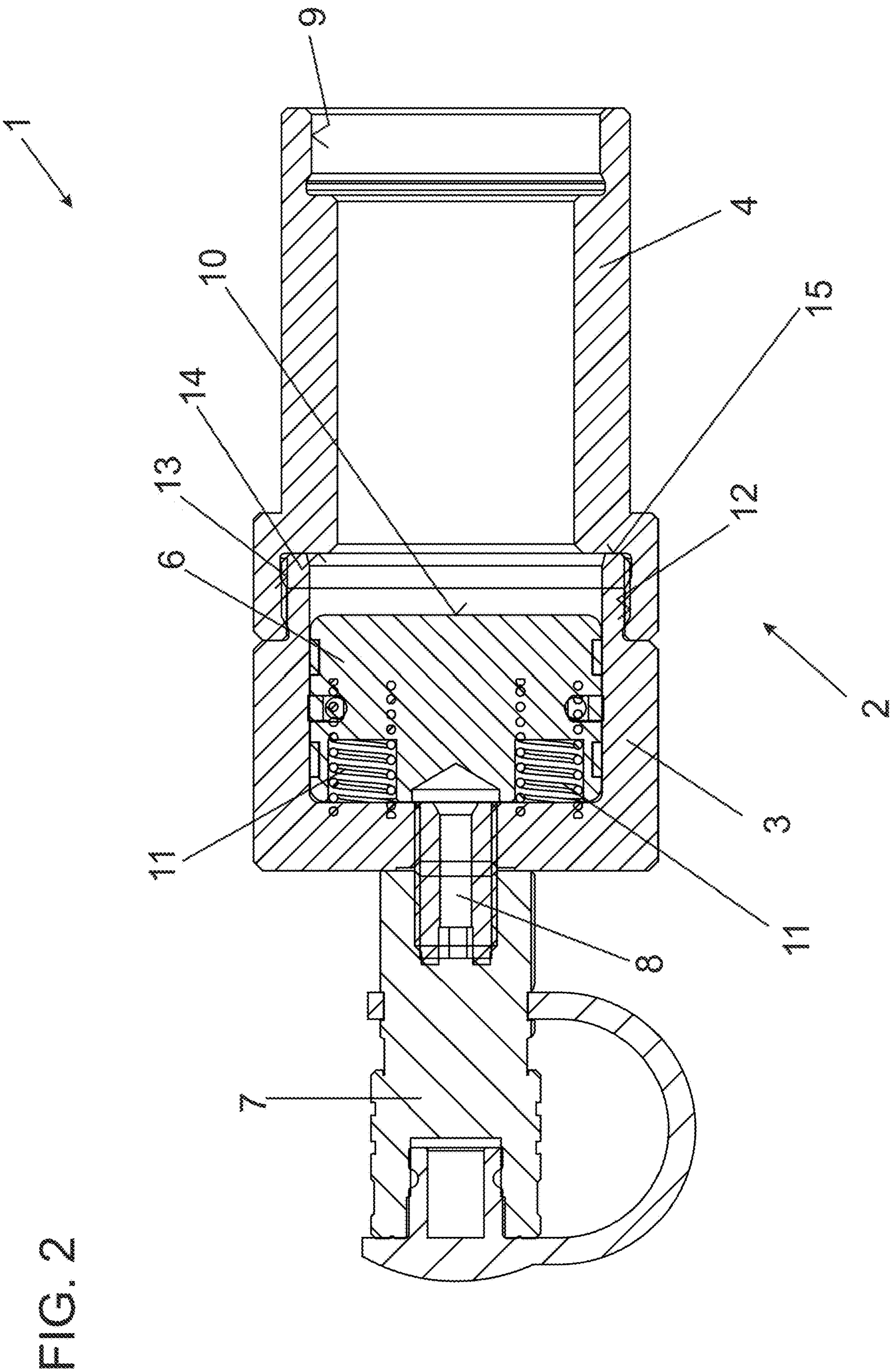
Figure 3:
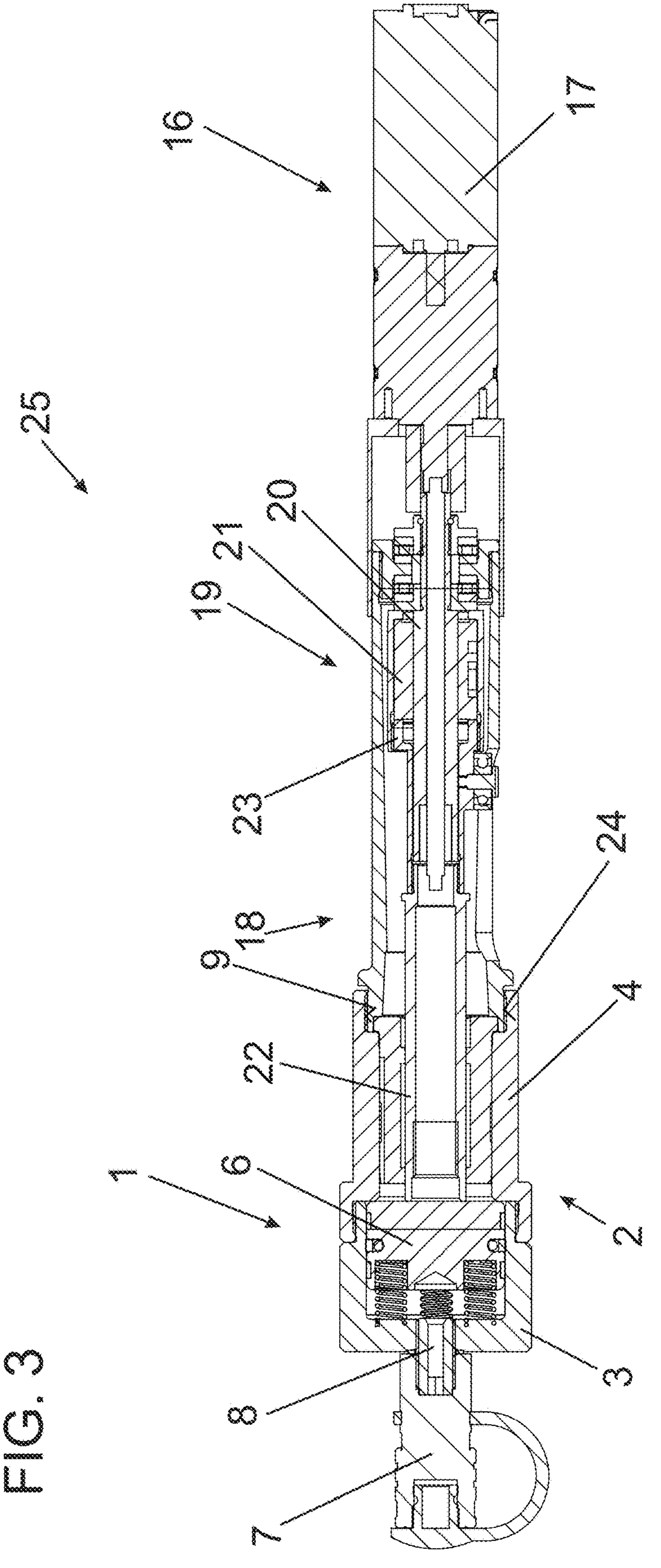

An embodiment of the invention is explained below with reference to the drawings. The drawings show in:

FIG. 1 a sectional view of a schematic representation of a hydraulic actuator with a hydraulic piston arranged in a starting position;

FIG. 2 a sectional view of a schematic representation of a hydraulic actuator with a hydraulic piston arranged in an end position, and FIG. 3 a sectional view of a schematic representation of a pulling and compression device with a hydraulic actuator arranged on it.

FIG. 1 shows a sectional view of an embodiment of a hydraulic actuator 1 with a housing body 2 formed from a base body 4 and a piston housing 3.

Inside the piston housing 3, a hydraulic piston 6 is adjustable between a starting position shown in FIG. 1 and an end position shown in FIG. 2. The inner surface of the piston housing 3, together with an end surface of the hydraulic piston 6, delimits a working chamber 5, which is filled with hydraulic fluid. Starting from the starting position shown in FIG. 1, the hydraulic piston 6, which in this position rests partially against a shoulder 14 of the base body 4 with an end face facing away from the working chamber 5, can be adjusted to the end position shown in FIG. 2, whereby during the adjustment, hydraulic fluid arranged in the working chamber 5 can be used via a hydraulic channel 8 to drive a hydraulic tool not shown here, which can be arranged on a hydraulic tool connection 7.

Helical compression springs 11, which are supported at one end on the hydraulic piston 6 and at the other end on an inner surface of the piston housing 3 opposite the hydraulic piston 6 in the adjustment direction, are used to return the hydraulic piston 6 from the end position shown in FIG. 2 to the starting position shown in FIG. 1, in which the hydraulic piston 6 again rests partially against the shoulder 14 of the base body 4.

To connect the hydraulic actuator 1 to a tension and compression device 25 shown in FIG. 3, the base body 4, which is connected to the piston housing 3 via an internal thread 12 and an external thread 13 on the piston housing, so that the shoulder 14 rests against an end face 15, has a connecting section 9, which is designed for detachable connection to a connection section 24 of the tension and compression device 25, so that the hydraulic actuator 1 can be arranged in a fixed position on the tension and compression device 25.

The pulling and compression device 25 has a drive unit 16 comprising an electric motor 17, by means of which a threaded spindle 20 of a screw drive 19 arranged in a housing body 18 can be driven. In addition to the threaded spindle 20, the screw drive 19 also has a threaded nut 21 arranged on the threaded spindle 20, said threaded nut 21 is mounted non-rotatably on the housing body 18. The threaded nut 21 is used to drive a tool holder in the form of a piston rod 22, which is mounted so as to be adjustable in the longitudinal axis direction of the threaded spindle 20, so that the hydraulic piston 6 can be adjusted in the direction of the hydraulic actuator 1 by means of the pulling and compression device 25 via the piston rod 22 as a drive element. The hydraulic piston 6 has a coupling section 10 on its end face facing the piston rod 22, so that movements of the piston rod 22 are reliably transmitted to the hydraulic piston 6. The piston rod 22 is connected to the threaded nut 21 via a detachably connected coupling unit 23, which at its end opposite the piston rod 22 rests against an end face of the threaded nut 21 facing away from the piston rod 22.

LIST OF REFERENCE SYMBOLS

1 Hydraulic actuator
2 Housing body
3 Piston housing
4 Base body
5 Working chamber
6 Hydraulic piston
7 Hydraulic tool connection
8 Hydraulic channel
9 Connecting section
10 Coupling section
11 Helical compression spring
12 Internal thread (base body)
13 External thread (piston housing)
14 Shoulder
15 End face
16 Drive unit
17 Electric motor
18 Housing body
19 Screw drive
20 Threaded spindle
21 Threaded nut
22 Piston rod; tool holder (drive element)
23 Coupling unit
24 Connection section (pulling-/compression device)
25 Pulling-/compression device

The invention claimed is:

1. Hydraulic actuator for an electro-mechanical driven pulling and compression device for driving hydraulic tools, with a housing body with a working chamber filled with hydraulic fluid, a hydraulic piston arranged in the working chamber to be displaceable between a starting position and an end position and a hydraulic tool connection with a hydraulic channel connected to the working chamber and having a self-closing valve, wherein the housing body has a connecting section for detachably fixing the hydraulic actuator to a connection section of the pulling and compression device, and the hydraulic piston has a coupling section for connection to a drive element of the pulling and compression device which is adjustable relative to the connection section.

2. Hydraulic actuator according to claim 1, wherein the coupling section is designed for positive connection to the drive element in the adjustment direction of the hydraulic piston.

3. Hydraulic actuator according to claim 1, wherein the coupling section is designed for connection to a drive element of the pulling and compression device designed as a tool holder.

4. Hydraulic actuator according to claim 1, wherein the connecting section has a thread or latching bodies for detachable fixing to the connection section of the pulling and compression device having a thread or latching body receptacles.

5. Hydraulic actuator according to claim 1, wherein the housing body is multi-part, in particular two-part.

6. Hydraulic actuator according to claim 1, wherein the hydraulic piston is spring preloaded in the direction of the starting position.

7. Hydraulic actuator according to claim 1, wherein the hydraulic tool connection comprises a quick coupling.

8. Hand-held pulling and compression device for driving interchangeable pulling and pressing tools, with a drive unit comprising an electric motor, a screw drive with a threaded spindle connected to the drive unit and mounted rotatably on a housing body, and a threaded nut mounted rotatably on the threaded spindle and non-rotatably on the housing body via a bearing unit, and a coupling unit connected to a tool holder, which is connected to the threaded nut in such a way that tensile and compressive forces resulting from the direction of rotation of the threaded spindle are transmitted to the coupling unit, comprising a hydraulic actuator detachably connected to the pulling and compression device according to claim 1.

* * * * *